United States Patent
Findikli et al.

(10) Patent No.: US 6,484,022 B1
(45) Date of Patent: Nov. 19, 2002

(54) WIRELESS COMMUNICATIONS DEVICE HAVING EXTERNALLY CONTROLLED TRANSMISSION OF IDENTITY

(75) Inventors: Nadi S. Findikli, Cary, NC (US); Inderpreet S. Ahluwalia, Chapel Hill, NC (US); Hans Carlson, Cary, NC (US); Annika B. Lindh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/391,268

(22) Filed: Sep. 7, 1999

(51) Int. Cl.[7] .......................... H04M 3/16; H04M 11/10; H04M 1/06

(52) U.S. Cl. ...................... 455/411; 455/550; 455/551; 455/418; 455/419; 455/558; 455/410

(58) Field of Search ................................. 455/410, 411, 455/414, 418, 419, 435, 550, 551, 558, 559, 434

(56) References Cited

U.S. PATENT DOCUMENTS

| | | | | |
|---|---|---|---|---|
| 5,537,474 A | * | 7/1996 | Brown et al. ................ | 380/248 |
| 5,561,840 A | * | 10/1996 | Alvesalo et al. ............ | 455/433 |
| 5,661,806 A | * | 8/1997 | Nevoux et al. ............. | 380/247 |
| 5,818,824 A | * | 10/1998 | Lu et al. ..................... | 370/328 |
| 6,119,000 A | * | 9/2000 | Stephenson et al. ........ | 455/432 |
| 6,373,949 B1 | * | 4/2002 | Aura .......................... | 380/247 |

FOREIGN PATENT DOCUMENTS

| | | |
|---|---|---|
| EP | 0 685 972 A2 | 12/1995 |
| EP | 0757502 A2 | 2/1997 |
| WO | WO98/59514 | 12/1998 |

OTHER PUBLICATIONS

Mouly, et al., "GSM System for Mobile Communications," Fr, Lassay–Les–Chateaux. Europe Media, 1993, pp. 106–109, 588–591.

Brown, D., "Techniques for Privacy and Authentication in Personal Communication Systems," IEEE Personal Communications, Aug. 1995, pp. 6–10.

TR–45 Proposed ballot of TR–45 UNIM/ESN Ad Hoc Group Recommendation; Chaired by Terry Watts, SBC Technology Resources, 9505 Arboretum Blvd., Austin, TX78759; dated Jul. 29, 1999.

The study of ESN issue in authentication procedure; Michio Kudo, DDI Corporation and Masayoshi Ohashi, KDD R&D Laboratories, Inc.; dated Jun. 7, 1999, Vancouver.

* cited by examiner

*Primary Examiner*—Nguyen T. Vo
*Assistant Examiner*—Edan Orgad
(74) *Attorney, Agent, or Firm*—Coats & Bennett, P.L.L.C.

(57) ABSTRACT

A method of controlling the transmission of identities for wireless communications devices relies on a broadcast message from the network to instruct the wireless communications devices as to when to send their identity information. The network's control over the transmissions is extended to the control function class level. In a simple embodiment, the network includes instructions in a broadcast message telling the receiving wireless communications devices to send their identities for some classes of control functions and not others. Thus, by altering the broadcast message, the network is able to control the identity transmissions of the wireless communications devices. In more sophisticated embodiments, the network can control not only whether identities are transmitted for certain control functions, but which identity is transmitted. Thus, one identity (e.g., subscription module identifier) may be transmitted with one class of control functions (e.g., registration) and another identity (e.g., mobile terminal identifier) to be transmitted with other classes of control functions (e.g., page response), thereby providing great flexibility of control to the network.

21 Claims, 2 Drawing Sheets

WIRELESS COMMUNICATIONS DEVICE HAVING EXTERNALLY CONTROLLED TRANSMISSION OF IDENTITY

BACKGROUND OF THE INVENTION

The present invention relates to the field of cellular wireless communications, and more particularly to a method of controlling the transmission of identities from wireless communications devices from outside the wireless communications device.

In order for a wireless communications network to check whether a particular service subscription is valid, the network must be able to identify the subscription. Typically this is done by having the wireless communications device provide a unique identifier to the network when requesting service. For instance, in a typical ANSI-41/ANSI-136 network, a cellular phone transmits its Electronic Serial Number (ESN) when the phone performs any one of a variety of wireless communications control functions, such as registration or call origination. While providing the subscription identity may be required in some instances, in others it merely consumes control channel transmission capacity without a real benefit. In order to lessen the burden on the network, ANSI-136 provides the network with a way of controlling the transmission of the identity. The ANSI-136 solution is to provide a broadcast control bit, known as the "S" bit, that the network may selectively turn on or turn off. When the S-bit is turned on, the wireless communications devices directly interacting with the network are required to transmit the identity when performing any of the wireless communications control functions known generally as registration, origination, page response, base station challenge order, R-data (teleservices), and SPACH confirmation. In essence, the existing ANSI-136 networks are able to turn on the identity transmission for all of these control functions or for none of these control functions, but nothing in-between. As such, if the network only needs the identity for one of the control functions, it must turn on the identity transmission for all of the control functions, thereby burdening the control channel with unnecessary traffic. Thus, there is a need for a method of controlling the transmission of device identity that provides the network with a greater level of flexibility in asking for the identity of the wireless communications device.

Further, it is possible that wireless communications devices will have more than one identity. Traditionally, a wireless communications device had one unique fixed identity in ANSI41/ANSI-136 networks. In the ANSI-136 nomenclature, this was the ESN. The wireless communications device was manufactured with this ESN, which under FCC regulations cannot be altered after manufacture. The traditional ANSI-41/ANSI-136 service subscription was then tied to a particular wireless communications device, typically by including the ESN as part of the subscription information necessary to identify the user to the network. Thus, the traditional ANSI41/ANSI-136 subscriber could not use a different piece of equipment, such as another user's phone handset, for the same subscription.

The situation with traditional ANSI41/ANSI-136 is to be contrasted with that under the standard known as Global System for Mobile Communication (GSM). In the GSM world, a wireless communications device has two functional parts, a subscription module and a mobile terminal. The subscription module, commonly known as either the Subscriber Identity Module (SIM), the SIM card, or a User Identity Module (UIM), may be thought of as an electronic identification card; it contains the subscription-related information required to verify the subscriber to the network. The SIM card typically includes memory and other electronics for performing a variety of functions, but the SIM card does not include the transceiver electronics necessary for the main GSM wireless communications. For reference, see GSM 11.11 and GSM 11.14 for SIM card specifications in the GSM network. Relevant to the present discussion, the SIM card contains a fixed subscription identifier, similar to that of the ESN of ANSI-136. For ease of reference, this identifier will be referred to as the $ESN_s$.

The mobile terminal is the rest of the wireless communications device without the subscription module. Thus, the mobile terminal is the handset or other main unit that includes the main GSM transceiver circuits, the speaker, etc. The mobile terminal likewise includes a fixed identifier, which will be referred to as the IMEI or the $ESN_m$.

The GSM subscription module is inserted or otherwise connected to the GSM mobile terminal to form a complete wireless communications device that is useable in GSM. The subscription information is read from the subscription module by the mobile terminal and transmitted to the network where the network determines whether the subscription is valid and registers the location of the subscription within the network. Thus, the GSM service subscription is typically not tied to a specific mobile terminal, but rather is tied to the subscription module. Because the subscription module authenticates the user to the network, the user is free to use any compliant mobile terminal equipment by simply mating their subscription module to the mobile terminal and repeating the authentication and registration process with the new mobile terminal hardware. Thus, it is not always necessary for the user to carry the complete wireless communications device in order to access his/her wireless service subscription. Instead, the user need only carry the subscription module and mate the module to an appropriate mobile terminal available on-location.

In GSM, there is a provision for the network to request that the wireless communications device send the $ESN_m$ of the mobile terminal, typically for purposes of tracking lost or malfunctioning mobile terminals. The process for this in GSM is for the GSM network to make contact with a particular wireless communications device and request that particular wireless communications device to send its $ESN_m$. There is no provision in GSM for the network to tell a plurality of wireless communications devices to send the $ESN_m$ when performing regular control functions; rather, a separate request must be made to each wireless communications device in turn. Thus, there remains a need for a method of controlling the transmission of identities associated with wireless communications devices.

The idea of allowing the use of small, inexpensive subscription modules, similar to SIM cards, is gaining favor in the ANSI-41/ANSI-136 world due to the desire for subscription mobility. However, traditional ANSI-41/ANSI-136 contemplates the existence of only one fixed identity per wireless communications device, not two. Quite simply, ANSI41/ANSI-136 anticipates that the equivalent to the subscription module will always be mated to the same mobile terminal, and will not be portable between mobile terminals, therefore only one fixed identity is required per wireless communications device. Because subscription-module-enabled wireless communications devices will have two fixed identities, ANSI41/ANSI-136 networks may need to be modified to accommodate the presence of more than one fixed identifier associated with a wireless communications device. For instance, the network may need the identity of the subscription module for, some control functions and the identity of the mobile terminal for others. Thus, there is a need for an improved ANSI41/ANSI-136 protocol that accommodates the presence of more than one fixed identifier associated with a wireless communications device. Such a method should preferably allow the network to request one of the identities be provided by the wireless communications device during some control functions, and another identity during other control functions. Preferably, the method should be flexible so that one wireless communication's network can request the first identity for a particular set of wireless control functions, while another wireless communications network can request the first identity for a different set of wireless control functions.

From the above, it is clear that there remains a need for an improved method of controlling the transmission of identities from wireless communications devices in wireless communications networks. Such a method should provide the network with a high degree of flexibility in asking for selected identities from the wireless communications device. Optionally, the method may allow the network to instruct the wireless communications devices to transmit one identity in some situations and another in other situations.

SUMMARY OF THE INVENTION

The present method relies on a broadcast message from the network to instruct the wireless communications devices as to when to send their identity information, with control being extended to the control function class level. In a simple embodiment, the network includes instructions in a broadcast message telling the receiving wireless communications devices to send their identities for some classes of control functions and not others. Thus, by altering the broadcast message, the network is able to control the identity transmissions of the wireless communications devices. In more sophisticated embodiments, the network can control not only whether identities are transmitted for certain control functions, but which identity is transmitted. Thus, one identity (e.g., subscription module identifier) may be transmitted with one class of control functions (e.g., registration) and another identity (e.g., mobile terminal identifier) to be transmitted with other classes of control functions (e.g., page response), thereby providing great flexibility of control to the network.

DETAILED DESCRIPTION

Figure 1:
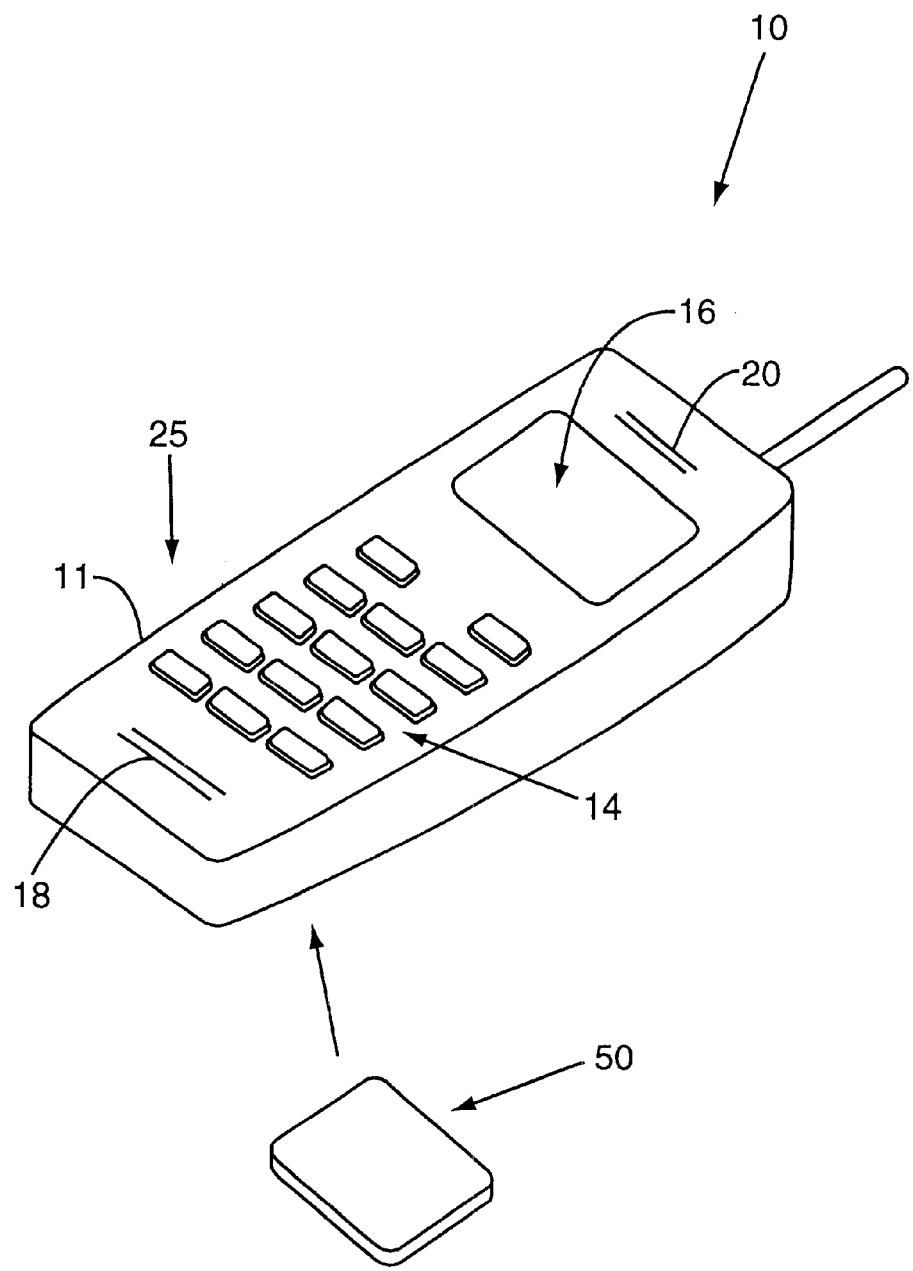
FIG. 1 is a perspective view of a wireless communications device showing a mobile terminal and a subscription module.
Figure 2:
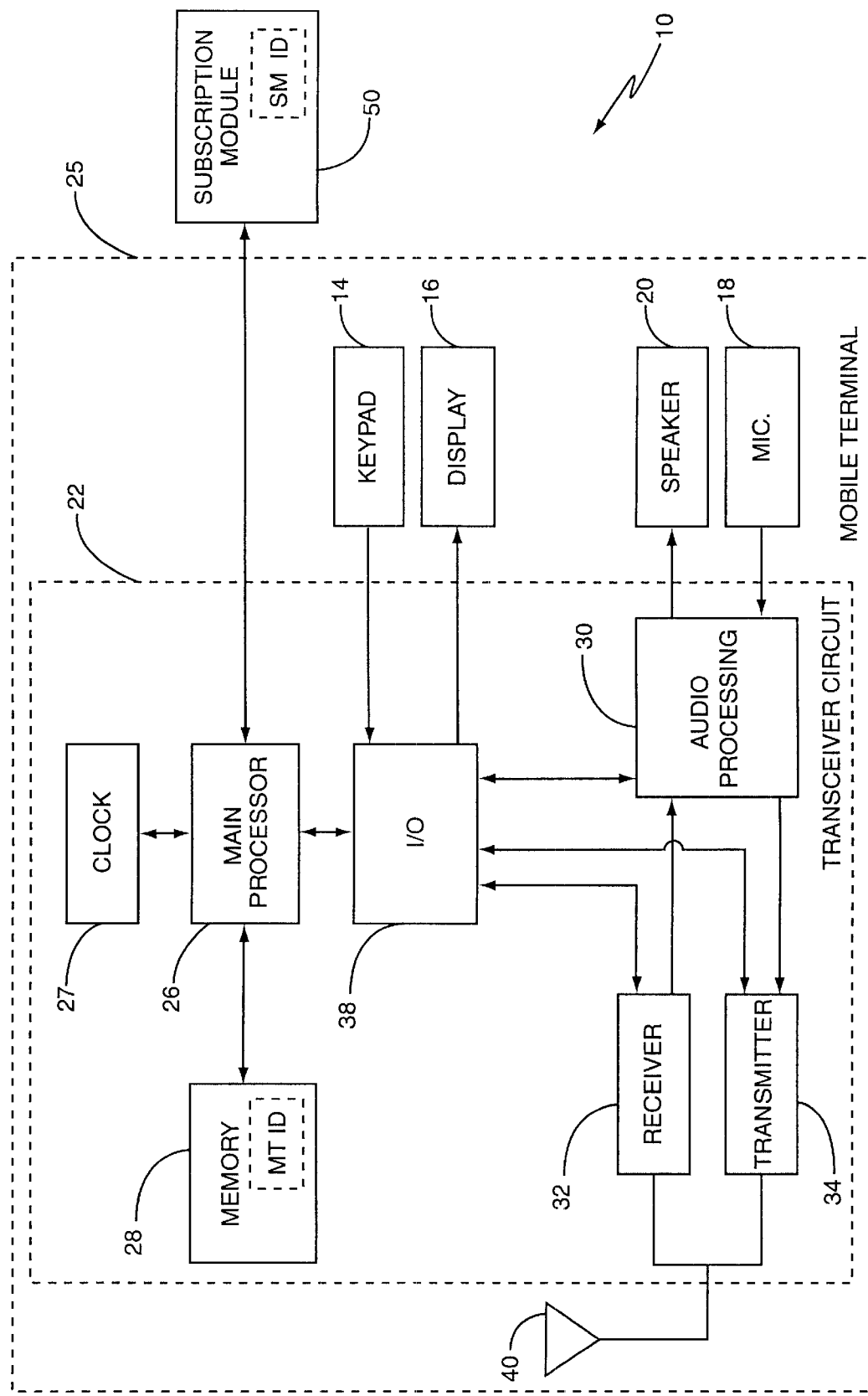
FIG. 2 is a schematic illustration of the components of FIG. 1.

A wireless communications device 10 having a fully functional mobile transceiver capable of transmitting and receiving radio frequency signals, such as a phone, is shown in FIGS. 1–2. For simplicity of discussion, a cellular telephone will be used as the example of the wireless communications device 10. The phone 10 typically includes a main unit 25, sometimes referred to herein as the mobile terminal, and a subscription module 50. See FIG. 1. The mobile terminal 25 includes a housing that contains a keypad 14, a display 16, a microphone 18, and a speaker 20. The keypad 14, display 16, microphone 18, and speaker 20 interface with a conventional transceiver circuit 22 generally disposed inside the housing 11 of the mobile terminal 25. The transceiver circuit 22, shown in FIG. 2, includes a main controller 26, such as a microprocessor, for controlling the overall operation of the mobile telephone 10, memory 28, audio processing circuits 30, a receiver 32, a transmitter 34, and optionally a clock 27. Input/output circuits 38 interface the control unit 26 with the keypad 14, display 16, audio processing circuits 3, receiver 32, and transmitter 34. The keypad 14 allows the operator to dial numbers, enter commands, and select options. The display 16 allows the operator to see dialed digits, stored information, and call status information. The audio processing circuits 30 accept analog audio inputs from the microphone 18 and provide basic analog audio outputs to the speaker 20. Memory 28 stores programs and data used by phone 10. The optional clock 27 helps determine the current time. The receiver 32 and transmitter 34 connect to a common antenna 40 to receive and transmit signals over an RF channel.

The mobile terminal 25 further includes a fixed mobile terminal identity; the mobile terminal identity is preferably hardcoded into a portion of the transceiver circuit 22, such as memory 28, and should not be alterable by the user under normal circumstances. For purposes of this illustrative example, the mobile terminal identity is formatted to meet the requirement of an Electronic Serial Number (ESN) of ANSI41/ANSI-136. Because the details of the general construction and operation of the mobile terminal 25, including transceiver circuit 22, are well-known in the art, they will not be further discussed herein except as appropriate to place the invention in context.

Removably attached to the mobile terminal 25 is a subscription module 50 that includes subscription information. While the subscription module 50 may include memory and other electronics for performing a variety of functions, for purposes of this invention the subscription module 50 contains a unique identifier, referred to herein as the subscription module identifier. Like the mobile terminal identity, the subscription module identifier is preferably hardcoded into the subscription module 50.

In communicating with the network, the wireless communications device performs a variety of control functions. These control functions are related to the control of information flow between the wireless communications device and the network and involve the transmission of control messages from the wireless communications device to the network. The messages associated with the control functions are typically transmitted on control channels, but it is known in the art to also usurp traffic channels for control functions in some instances. Examples of the control functions include registration, call origination, page response, R-data (teleservices), base station challenge order, SPACH confirmation, and the like. These control functions are to be differentiated from regular traffic functions such as encoding, decoding, and the like.

In general, the control functions may be grouped into several classes, depending on their general purpose. For instance, the following control function classes may exist: registration, call origination, paging, other. Each control function class contains one or more control functions. For instance, the registration class may include power-up registration, periodic re-registration, power-down registration, and similar control functions.

While the wireless communications device transmits control function messages to the network, the network also transmits control messages to the wireless communications devices. In general, the network may transmit control messages to a specific wireless communications device, such as a power level command, or the network may transmit control messages to a plurality of wireless communications devices. This later type of transmissions are typically referred to as "broadcast messages." The broadcast messages are not intended for only one wireless communications device, but are rather intended for any wireless communications devices that are listening to the message. Examples of broadcast messages include DCCH structure messages, access parameter messages, registration parameter messages, and other messages relating to the format of control and/or traffic messages transmitted by the wireless communications device.

In the present invention, the wireless communications device selectively sends its identity depending on the instructions from the network as reflected by the broadcast message. In a simple example, the broadcast message may contain three bits for controlling the transmission of the identity for three different classes of control functions. For example an R-bit may be used to control the control functions belonging to the registration class, an O-bit for origination class, and P-bit for page response class. For example, the following map may be used:

TABLE 1

| Bits from Broadcast Message | | | |
|---|---|---|---|
| R | O | P | Action |
| x | x | 0 | Do not send identity for page class |
| x | x | 1 | Send identity for page class |
| x | 0 | x | Do not send identity for origination class |
| x | 1 | x | Send identity for origination class |
| 0 | x | x | Do not send identity for registration class |
| 1 | x | x | Check 2nd level map for registration class |

As shown in Table 1, when the P-bit is "0", the network is instructing the wireless communications devices not to transmit their identities for control functions belonging to the page class while if the P-bit is "1", the wireless communications devices are to transmit their identities for the same control functions. Similar logic applies to the O-bit for origination class control functions. The registration class control functions are controlled by the R-bit. If the "R" bit is "0", the network is instructing the wireless communications devices not to transmit their identities for control functions belonging to the registration class. If the R-bit is "1", the wireless communications devices are to examine another two bits, such as the D-bits, for more detailed information. In this example, the D-bits may be used to further divide the registration class control functions for greater level of control. The D-bits may as follows:

TABLE 2

| Bits from Broadcast Message | | |
|---|---|---|
| $D_1$ | $D_2$ | Action |
| 0 | 0 | Send identity for initial registration only |
| 0 | 1 | Send identity for periodic re-registration only |
| 1 | 0 | Send identity for power-down registration |
| 1 | 1 | Send identity for both initial registration and periodic re-registration |

Based on the content of the broadcast message, the wireless communications devices transmit their identifier with the appropriate control function messages, in a manner known in the art. For instance, the identifier may be transmitted in the slot reserved for the ESN, may be appended to the control message, or otherwise added to the control message.

Of course, those of skill in the art will realize that other map structures than those shown may be employed; as such, the map structures are not intended to be limiting. Indeed, the map structure may be one level, two levels, or any other number of levels. Preferably, the map structure should be such as to minimize the additional transmission overhead on the network while remaining simple enough for quick deciphering by the wireless communications device.

Using the method described above, the network may control the transmission of wireless communications device identity with a great level of flexibility for tailoring to particular circumstances. For instance, the network may broadcast a message requiring the identity for many control functions during light load times, but cut down on the number of control functions during heavy traffic times. The method allows this level of control while avoiding the need for a separate contact with each wireless communications device. Thus, by using a broadcast message, the network may tailor the transmission of wireless communications device identity to its needs.

In the example above, the wireless communications device may have only one identifier, such as the ESN of the traditional ANSI41/ANSI-136 cellular telephones. Alternatively, for wireless communications device having two or more identities, the broadcast message may be used to control the transmission of a predetermined one of the identities, such as the subscription module identifier or the mobile terminal identifier. Thus, the method of the present invention may be used by the network to selectively turn on or off the transmission of a given identity during selected control function transmissions.

In more advanced embodiments, the method may expanded to selectively turn on or off the transmission of two or more identities. By way of example, the method may be used to selectively authorize the transmission of the subscription module identifier, or the mobile terminal identifier, or both, or neither, with the control function messages. For example, the traditional "S" bit of ANSI-41/ANSI-136 may be used to indicate that no identifiers should be sent or that at least one identifier should be transmitted for at least one control function message. When at least one identity is to be transmitted, the broadcast message could be further deciphered according to the following detail map:

TABLE 3

| Bits from Broadcast Message | Action |
|---|---|
| xxxx00 | Send no ID with Registrations |
| xxxx01 | Send S-mod. ID with Registrations |
| xxxx10 | Send Mobile Terminal ID with Registrations |
| xxxx11 | Send both S-Mod. ID & Mobile Terminal ID with Registrations |
| xx00xx | Send no ID with Originations |
| xx01xx | Send S-mod. ID with Originations |
| xx10xx | Send Mobile Terminal ID with Originations |
| xx11xx | Send both S-Mod. ID & Mobile Terminal ID with Originations |
| 00xxxx | Send no ID with Page Responses |
| 01xxxx | Send S-mod. ID with Page Responses |
| 10xxxx | Send Mobile Terminal ID with Page Responses |
| 11xxxx | Send both S-Mod. ID & Mobile Terminal ID with Page Responses |

Of course, more complicated broadcast message coding schemes could be used for additional control. With this more sophisticated embodiment, the control function classes may be controlled independently of the others, allowing one identity (e.g., subscription module identifier) to be transmitted with one class of control functions and another identity (e.g., mobile terminal identifier) to be transmitted with other classes of control functions, thereby providing great flexibility.

To illustrate the process, assume that the wireless communications device has two fixed identities, one associated with the subscription module 50 and one associated with the mobile terminal 25, as described above. Further, assume that the broadcast message mapping scheme of Table 3 is used. With a plurality of wireless communications devices registered on the network, the network determines that it is appropriate to receive subscription module identifiers with call originations, but the mobile terminal identifiers with registrations, and no identifiers with page responses. The network would transmit a broadcast message with the "S" bit turned on and the bit sequence 000110 elsewhere in the broadcast message. The various wireless communications devices would receive and decode the broadcast message. In response thereto, the wireless communications devices would make the appropriate changes to their software, based on the instructions in the broadcast message. Thereafter, when any one of the wireless communications devices performs a registration control function, it would send its mobile terminal identifier. Likewise, when any one of the wireless communications devices performs a call origination control function, it would send its subscription module identifier. Further, when any one of the wireless communications devices performs a page response control function, it would not send either identifier. Later, if the network determine s that a different set of instructions is appropriate, the network merely constructs and transmits a new broadcast message. Preferably, the current broadcast message is relatively continuously broadcast on the appropriate control channels such that all wireless communications devices joining the network receive the appropriate instructions from the beginning.

Using the present method, the network may selectively turn on or off the transmission of a given identity during selected control function transmissions. Optionally, the network may selectively control the transmission of more than one identity from the wireless communications device receiving service therefrom.

For clarity, the discussion above has assumed that the wireless communications device 10 is a cellular telephone. However, it is to be understood that other wireless communications devices, such as personal communications assistants, pagers, and the like, are also within the scope of the present invention. Further, the discussion focused on the operation of the present invention in the context of an ANSI-41/ANSI-136 network. However, the present invention is not so limited, but may instead apply to terrestrial GSM, IS-95, CDMA, WCDMA, cdma 2000, and similar networks, and also to satellite based networks.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of controlling a wireless communications device so as to selectively transmit identification information, comprising:

a) providing a plurality of wireless communications devices with a corresponding plurality of identities, including providing a first wireless communications device with a first fixed identity;

b) receiving, at said first wireless communications device, a first broadcast control message intended for a plurality of wireless communications devices including said first wireless communications device, said broadcast control message instructing said wireless communications devices to transmit said fixed identity when performing a first selected class of wireless communications control functions; and c) thereafter, said first wireless communications device conditionally transmitting said first fixed identity depending on the instructions of said broadcast control message when said first wireless communications device performs a wireless communications control function belonging to said first selected class of wireless communications control functions.

2. The method of claim 1 wherein said wireless communications device includes a subscription module removably joined to a mobile terminal and wherein said fixed identity is associated with said mobile terminal.

3. The method of claim 1 wherein said wireless communications device includes a subscription module removably joined to a mobile terminal and wherein said fixed identity is associated with said subscription module.

4. The method of claim 1 wherein said first fixed identity is an Electronic Serial Number according to ANSI-136.

5. The method of claim 1 further including, a) thereafter, receiving, at said first wireless communications device, a second broadcast control message different from said first broadcast control message and instructing said wireless communications devices to transmit said fixed identity when performing a second selected class of wireless communications control functions; and b) thereafter, said first wireless communications device conditionally transmitting said first fixed identity depending on the instructions of said second broadcast control message when said first wireless communications device performs a wireless communications control function belonging to said second selected class of wireless communications control functions.

6. The method of claim 1 further including:

a) providing a second wireless communications device with a second fixed identity different from said first fixed identity of said first wireless communications device prior to said receiving of said broadcast control message at said first wireless communications device;

b) receiving, at said second wireless communications device, said broadcast control message;

c) thereafter, said second wireless communications device conditionally transmitting said second fixed identity depending on the instructions of said broadcast control message when said second wireless communications device performs a wireless communications control function belonging to said selected class of wireless communications control functions.

7. The method of claim 6 wherein said first and second wireless communications devices are cellular mobile telephones.

8. The method of claim 7 wherein said first and second wireless communications devices are ANSI-136 complaint cellular mobile telephones.

9. A method of controlling the transmission of identification information from a plurality of wireless communications devices, the wireless communications devices each capable of performing a plurality of control functions belonging to a plurality of control function classes, the method comprising:

a) transmitting a broadcast control message to said plurality of wireless communications devices to control the selective transmission of identification information from said wireless communications devices based on said broadcast control message for each control function class independently of other control function classes.

10. The method of claim 9 wherein said wireless control devices have at least a mobile terminal portion and a subscription module portion removably joined to said mobile terminal portion, said mobile terminal portion having a first fixed identity associated therewith and said subscription module having a second fixed identity associated therewith, and including controlling the selective transmission of said first identity and said second identity from said wireless communications devices based on said broadcast control message.

11. A method for a wireless communications device to provide identification information in a wireless communications network, comprising:

a) providing a wireless communications device with a unique fixed identity;

b) receiving, at said wireless communications device, a broadcast control message intended for a plurality of wireless communications devices, said broadcast control message instructing said wireless communications device to transmit said fixed identity when performing a selected class of wireless communications control functions;

c) thereafter, and in response to said broadcast control message, said wireless communications device transmitting said fixed identity when performing a wireless communications control function belonging to said selected class of wireless communications control functions.

12. A method of providing identification information in a wireless communications network, comprising:

a) providing a wireless communications device having at least a mobile terminal portion and a subscription module portion removably joined to said mobile terminal portion, said mobile terminal portion having a first fixed identity associated therewith and said subscription module having a second fixed identity associated therewith;

b) selecting said first identity or said second identity based on a broadcast message received by said wireless communications device, said broadcast message intended for a plurality of wireless communications devices;

c) in response to said broadcast message, said wireless communications device transmitting said selected identity as part of a subsequent control message.

13. A method of requesting identification information from a plurality of wireless communications devices, the wireless communications devices each having a subscription module removably joined to a mobile terminal, each subscription module and mobile terminal having a separate fixed identity associated therewith, the method comprising:

a) transmitting a first broadcast control message to said plurality of wireless communications devices, said broadcast control message indicating to said wireless communications devices which of a plurality of control messages to be transmitted by the wireless communications devices should include identities selected from the group comprising:

i) the identity of the corresponding subscription module;
ii) the identity of the corresponding mobile terminal;
iii) the identities of both the corresponding subscription module and the corresponding mobile terminal;
iv) or neither the identity of the corresponding subscription module nor the identity of the corresponding mobile terminal.

14. The method of claim 13 wherein said control messages to be transmitted by the wireless communications devices include at least each of the following processes: activation request, registration, page response, and call origination.

15. The method of claim 13 wherein said first broadcast control message indicates to said wireless communications devices that registration control messages should include said identities of the corresponding subscription modules, but that non-registration control messages should not include said identities of the corresponding subscription modules.

16. The method of claim 15 wherein said first broadcast control message indicates to said wireless communications devices that periodic re-registration control messages should include said identities of the corresponding subscription modules.

17. The method of claim 13 wherein said broadcast control message indicates to said wireless communications devices that call origination control messages should include said identities of the corresponding subscription modules.

18. The method of claim 13 wherein said first broadcast control message indicates to said wireless communications devices that page response control messages should include said identities of the corresponding mobile terminals.

19. The method of claim 13 further including thereafter transmitting a second broadcast control message to said plurality of wireless communications devices to override said first broadcast message.

20. A method of selectively providing a plurality of identities associated with wireless communications devices, comprising:

a) providing each of a plurality of wireless communications devices with two different identities;

b) broadcasting a message directed to a plurality of said wireless communications devices instructing said wireless communications devices which of said identities to transmit when performing a wireless communications control function belonging to a selected class of control functions;

c) thereafter, at least one of said wireless communications devices transmitting the corresponding identity, in response to said broadcast message, when performing any wireless communications control function belonging to said selected class of control functions.

21. A method of selectively providing a plurality of identities associated with wireless communications devices, comprising:

a) establishing a first, second, third, and fourth unique identities; said first and third identities belonging to an first identity class and said second and fourth identities belonging to a second identity class;

b) providing a first wireless communications device with said first and second unique identities and providing a second wireless communications device with said third and fourth unique identities;

c) broadcasting a message directed to at least said first and second wireless communications device instructing said wireless communications devices to transmit their identities belonging to said first identity class when performing a particular wireless communications control function;

d) thereafter:
   i) said first wireless communications device performing said particular wireless communications control function and, in response to said broadcast message, transmitting said first identity;

ii) said second wireless communications device performing said particular wireless communications control function and, in response to said broadcast message, transmitting said third identity.

* * * * *

UNITED STATES PATENT AND TRADEMARK OFFICE
CERTIFICATE OF CORRECTION

PATENT NO.    : 6,484,022 B1
DATED         : November 19, 2002
INVENTOR(S)   : Nadi S. Findikli et al.

It is certified that error appears in the above-identified patent and that said Letters Patent is hereby corrected as shown below:

<u>Title page,</u>
Item [75], the third inventor's last name, "Carlson" should be -- Carlsson --.

Signed and Sealed this

Eighteenth Day of March, 2003

JAMES E. ROGAN
*Director of the United States Patent and Trademark Office*